United States Patent [19]

Kodama et al.

[11] Patent Number: 5,422,048
[45] Date of Patent: Jun. 6, 1995

[54] METHOD OF PRODUCING A BENT RESIN TUBE

[75] Inventors: Tsutomu Kodama, Komaki; Kazuhiro Kato, Nagoya; Katsuaki Nagae, Kasugai, all of Japan

[73] Assignee: Tokai Rubber Industries, Ltd., Komeki, Japan

[21] Appl. No.: 129,398

[22] Filed: Sep. 30, 1993

[30] Foreign Application Priority Data

Sep. 30, 1992 [JP] Japan .................. 4-286688

[51] Int. Cl.⁶ .................. B06B 3/00; B29C 35/14; B29C 53/08
[52] U.S. Cl. .................. 264/23; 264/25; 264/26; 264/173; 264/211; 264/295; 264/296; 264/322; 264/339; 264/DIG. 65
[58] Field of Search .................. 264/23, 25, 26, 70, 264/104, 105, 173, 211, 295, 296, 322, 339, DIG. 65

[56] References Cited

U.S. PATENT DOCUMENTS 4,255,378 3/1981 Miller et al. .................. 264/322
5,200,124 4/1993 Bowkett .................. 264/25

FOREIGN PATENT DOCUMENTS 1-122428 5/1989 Japan .................. 264/339
1645170 4/1991 U.S.S.R. .................. 264/339

Primary Examiner—Leo B. Tentoni
Attorney, Agent, or Firm—Jacobson, Price, Holman & Stern

[57] ABSTRACT

A method of producing a bent resin tube by heating a certain portion of a straight resin tube to be bent partially by a partial bending means, and bending the heated certain portion partially by a partial bending die, thereby rendering a desired bend shape to the tube. In this method, a large die for constraining the shape of the whose tube or a large oven is not required. Therefore, space for equipment can be reduced, and production efficiency is enhanced because the time required for bending operations is decreased remarkably. The heating may be done by high frequency induction heating, high frequency dielectric heating, or other conventional heating.

6 Claims, 10 Drawing Sheets

METHOD OF PRODUCING A BENT RESIN TUBE

BACKGROUND OF THE INVENTION

1. Field of the Invention

This invention relats to a method of producing a bent resin tube.

2. Description of the Prior Art

Figure 13A:
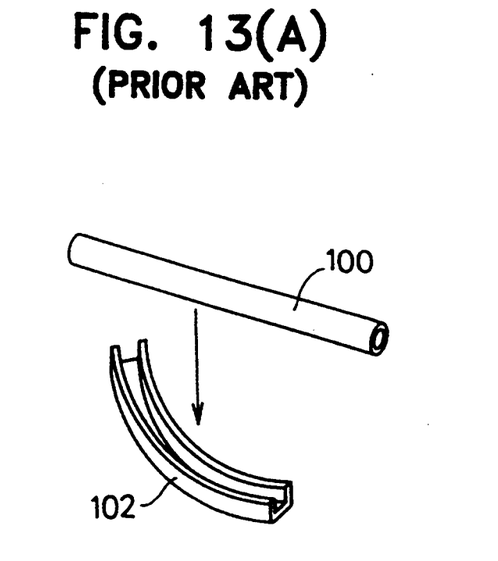
FIGS. 13(A) and 13(B) are views showing apparatus used in the conventional methods for producing a bent resin tube.

Conventionally, a bent resin tube has been produced by taking the following procedures. First, as shown in FIG. 13(A), a straight resin tube 100 is prepared, and inserted in a whole contraining die 102 having a U-shape cross section and a length corresponding to the length of the tube 100 so as to constrain the shape of the whole tube 100. Second, the die 102 having the tube 100 therein is placed in a heating oven, and heater, for example, at 150° to 160° C. for 20 to 30 minutes, thereby rendering a bend shape to the tube 100. Then, the die 102 is taken out of the oven and cooled, and the bent resin tube is released from the whose constraining die 102.

Figure 13B:
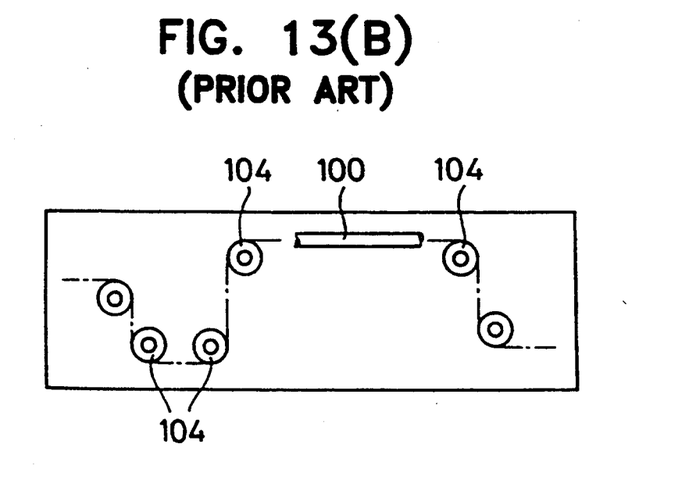

Otherwise, as shown in FIG. 13(B), the straight resin tube 100 is constrained in a bend shape by a plurality of pulley dies 104, and the tube 100 and the pulley dies 104 in that state are heated in a heating oven to render the bend shape to the tube 100. Then procedures similar to the above are taken.

In these conventional methods, however, the dies 102, 104 for constraining the shape of the whole resin tube 100 have a considerable heat capacity in themselves, and it is necessary to heat the die 102 or 104 to a predetermined temperature in the oven. Accordingly, it takes a long time to heat them in the oven, and to cool them after taken out of the oven. For these reasons, the production of bent resin tubes has a poor efficiency. Moreover, for example, in the case of producing resin tubes as long as 3 to 4 meters, a large size oven is required, and the cost of equipment is considerably high.

In addition, in these conventional methods, when the curvature of the bent portion, i.e., the bend radius of the bent portion is small, forcible bending of the resin tube 100 has a possibility of causing a kink. To avoid this phenomenon, the straight tube 100 must be preheated before inserted in the bending die 102 or 104. This preheating also prevents the improvement of the production efficiency.

Further, in these methods, hand labor is required to insert the resin tube 100 into the bending die 102 or 104. Moreover, different whole constraining dies are necessary for different desired bend shapes of resin tubes.

SUMMARY OF THE INVENTION

The present invention has been conceived in view of the above problems. Therefore, it is an object of the present invention to provide a method of producing a bent resin tube with a superior production efficiency, wherein a large size die for constraining the shape of the whole resin tube or a large size oven is not used and heating is required only for a very short time.

It is another object of the present invention to provide a method of producing a bent resin tube with an excellent production efficiency, wherein the bent resin tube is produced while an elongated straight resin tube is intermittently fed.

The present invention overcomes the disadvantages of the prior art by providing a method of producing a bent resin tube, comprising the steps of heating a certain portion of a straight resin tube to be bent partially by a partial heating means and bending the heated certain portion partially by a partial bending die, thereby rendering a desired bend shape to the resin tube.

According to a second aspect of the invention, after a certain portion of a straight resin tube to be bent is placed in a partial bending die, ultrasonic vibrations are applied to the certain portion through a horn constituting the bending die so as to heat the certain portion partially. Then the heated resin tube is bent partially by the partial bending die to render a desired bend shape to the resin tube.

According to the third aspect of the invention, a straight resin tube is formed which comprises a single conductive layer in which conductive powder is mixed or a plurality of layers including a conductive layer in which said conductive powder is mixed. The straight resin tube is heated partially by high frequency induction heating the conductive layer of a certain portion to be bent, and the heated certain portion is bent partially by a partial bending die.

According to a fourth aspect of the invention, a straight resin tube is formed which comprises a single conductive layer in which conductive powder is mixed or a plurality of layers including a conductive layer in which said conductive powder is mixed. A certain portion of the straight resin tube to be bent is placed between a pair of opposing partial bending dies, and heated partially by high frequency induction heating by forming an alternating current magnetic field between the pair of partial bending dies. At the same time, the certain portion is bent partially by the pair of partial bending dies.

According to a fifth aspect of the invention, a certain portion of a straight resin tube to be bent is placed between a pair of opposing partial bending dies, and conductors which constitute bending portions of the partial bending dies are heated by high frequncy induction heating, thereby partially heating the certain portion to be bent. At the same time, the certain portion is bent partially by the partial bending dies.

According to a sixth aspect of the present invention, a straight resin tube is formed which comprises a single or a plurality of layers including a conductive or semi-conductive layer in which said conductive power is mixed. The conductive or semiconductive layer of a certain portion to be bent is heated by high frequency dielectric heating, thereby heating the straight resin tube partially. At the same time, the heated certain portion is bent partially by a partial bending die.

According to a seventh aspect of the present invention, an elastic mandrel in which conductive powder is mixed is inserted into a straight resin tube, and a certain portion of the straight resin tube to be bent in which the elastic mandrel is held is placed between a pair of opposing partial bending dies. Then the certain portion is heated partially by high frequency induction heating by forming an alternating current magnetic field between the pair of partial bending dies. At the the same time, the certain portion is bent partially by the pair of partial bending dies.

The above production methods may be executed while the straight resin tube to be bent is intermittently fed from an elongated resin tube.

As mentioned in the above, the first aspect of the invention is to render a desired whole bend shape to a resin tube by heating a certain portion of a straight resin tube partially and bending the certain portion partially.

The heating means may be high frequency heating such as high frequency induction heating and high frequency dielectric heating, the partial heating by an infrared ray heater or a far infrared ray heater, spot heating by a hot blow, or other various heating.

The method of producing a bent resin tube according to the present invention has following advantages.

A large die for constraining the whole shape is not required, and there is no need to heat the whole resin tube.

A large size heating oven which has been required in the conventional methods is no more required, and therefore space for equipment can be reduced sharply. Further, time for bending operations can be shortened sharply, and accordingly production efficiency is much improved.

Since the resin tube is partially bent after or while the resin tube is heated partially, there is no need to preheat the resin tube before bending. Further, even when the bend shape of the whole resin tube is different, the same partial pattern die can be used as long as the partial bend shape is the same. Therefore, bending dies can be generally used to various purposes.

Additionally, since bending is conducted partially in the method of the present invention, it is easier to mechanize and automate the bending operations when compared to the conventional methods in which the whole tube is bent all at once.

The second aspect of the invention is to apply ultrasonic vibrations to a certain portion of a prepared straight resin tube through a horn and bend the tube partially. In this method, the certain portion of the resin tube to be bent is uniformly heated by internal heating, and bending can be conducted simultaneously with heating.

In bending, no excessive force is applied on the certain portion of the resin tube to be bent, so smooth bending is achieved. Further, the bending operations can be finished in a very short time.

BRIEF DESCRIPTION OF THE DRAWINGS

Other objects and features of the invention will become apparent to those skilled in the art as the disclosure is made in the following description of performed embodiments of the invention, as illustrated in the accompanying drawings, in which.

DETAILED DESCRIPTION OF THE PREFERRED EMBODIMENTS

First Preferred Embodiment

Now, a method of a first preferred embodiment according to the present invention will be described in detail with reference to FIGS. 1(I) to 3.

Figure 1A:
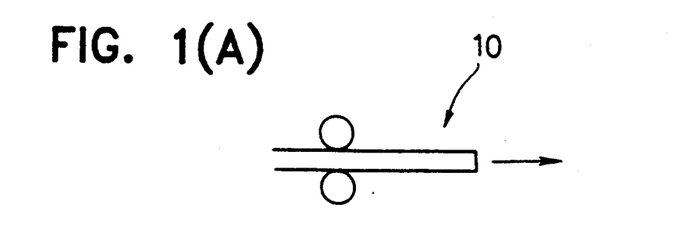
FIGS. 1(A) to 1(D) are diagrammic views for explaining a method of a first preferred embodiment according to the present invention.
Figure 1B:
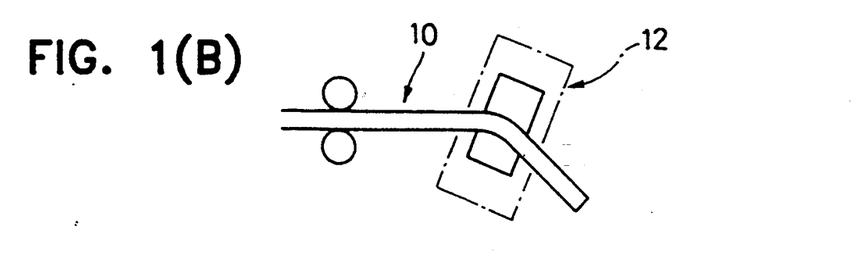
Figure 1C:
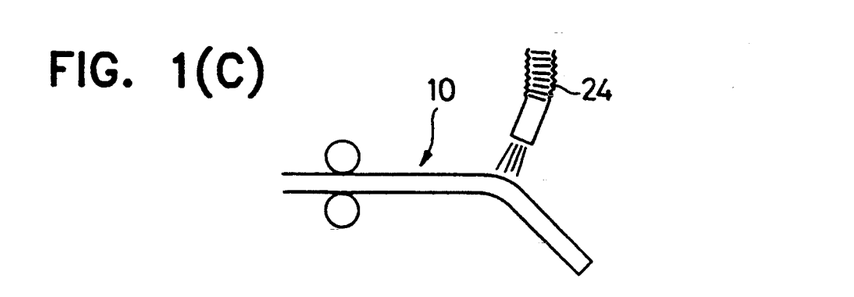
Figure 1D:
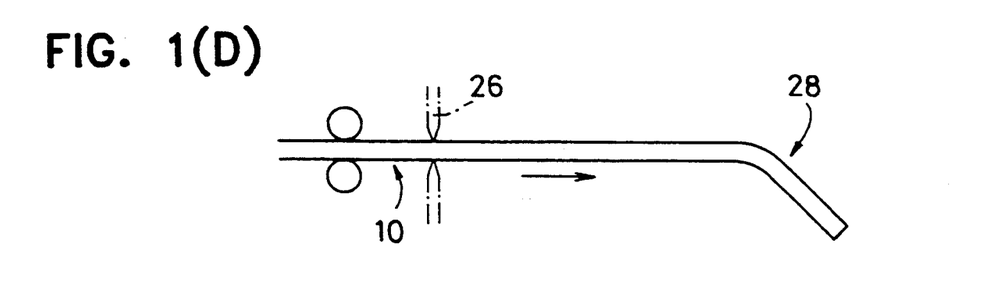

First, one end of a straight resin tube 10 which has been produced in a great length by extrusion molding is fed as shown in FIG. 1(I), and when a certain portion of the elongated straight tube 10 to be bent reaches a predetermined position, the certain portion is bent partially by a partial bending apparatus 12 as shown in FIG. 1(II).

Figure 2A:
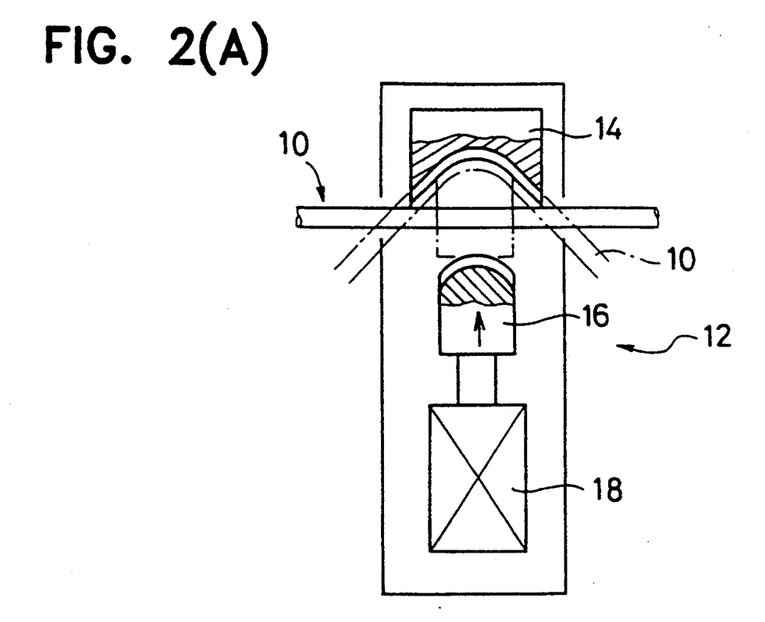
FIGS. 2(A) and 2(B) are diagrammic views of partial bending apparatus used in the method of the first preferred embodiment according to the present invention.

FIG. 2(A) shows the construction of the partial bending apparatus 12. As shown in the drawing, the partial bending apparatus 12 comprises a female die 14 constituting a stationary die, a horn 16 which functions as a male die and movable diel, and an ultrasonic apparatus main unit 18 having an ultrasonic generator and an extruding cylinder. The female die 14 and the horn 16 in combination constitute a bending die.

In operation of the partial bending apparatus 12, the movable horn 16 is extruded so as to contact the certain portion of the resin tube 10 to be bent, and ultrasonic vibrations are applied to the certain portion through the horn 16, thereby internally heating and softening the certain portion. Then, the softened certain portion is sandwiched by the horn 16 and the female die 14, and bent into a shape constrained by the horn 16 and the female die 14.

Figure 2B:
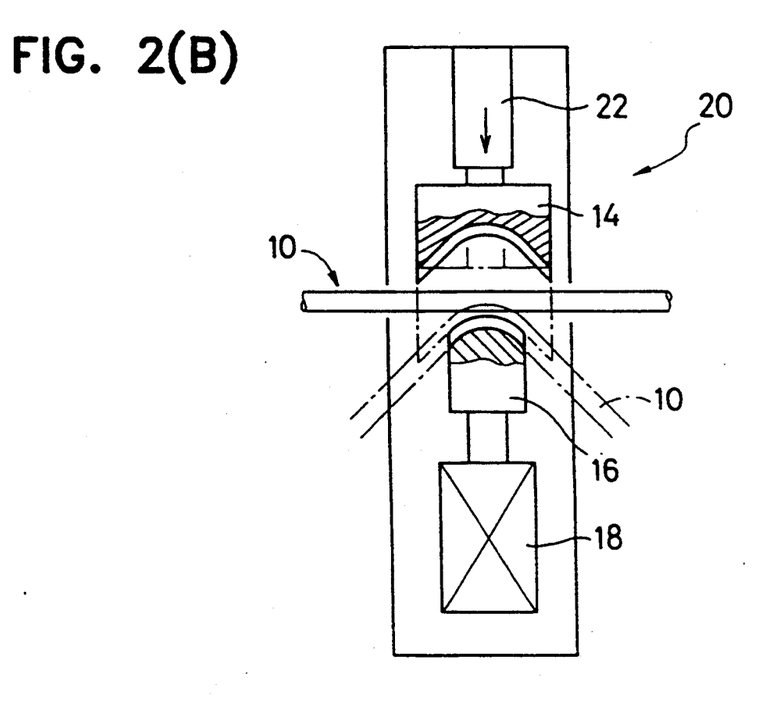

Alternatively, the partial bending apparatus may have a construction shown by a partial bending apparatus 20 in FIG. 2(B), in which the female die 14 can be extruded and retracted by an extruding cylinder 22 and the horn 16 is stationary (or movable).

After the certain portion of the resin tube 10 is bent partially in this way, the bent portion is cooled by blowing a cold gas through a duct 24 as shown in FIG. 1(III).

Then, the resin tube 10 is fed again and cut into a predetermined length by a cutter 26 as shown in FIG. 1(IV). Thus, a bent resin tube 28 is obtained.

Figure 3:
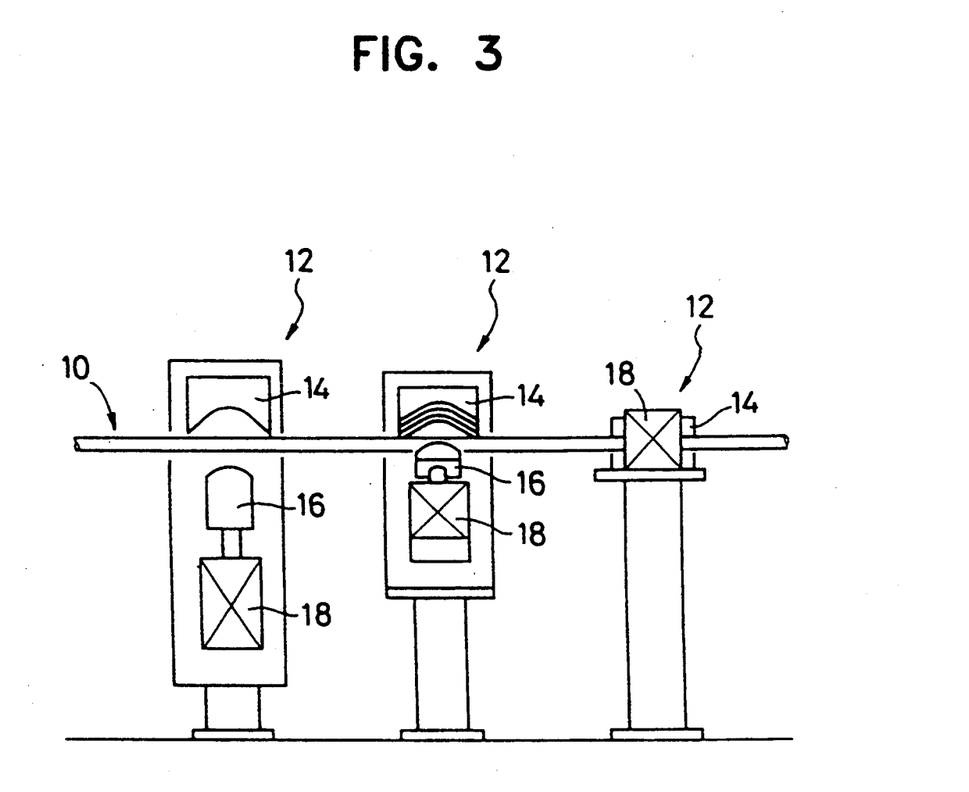
FIG. 3 is a side view of a plurality of partial bending apparatus installed in order to produce a resin tube having a three dimensional bend shape according to the first preferred embodiment of the present invention.

In the case of producing a resin tube which is three-dimensionally bent at a plurality of portions, as shown in FIG. 3, a plurality of partial bending apparatus 12 are installed in the feed direction of the resin tube 10 with varying the facing directions so that a plurality of portions of a straight tube are bent by the respective partial bending apparatus 12.

Otherwise, a plurality of partial bending apparatus 12 may be installed in the same position with varying the facing directions so that only one portion of a straight tube is bent into different directions by the respective partial bending apparatus 12.

The method of the first preferred embodiment does not need to employ a die for constraining the whole resin tube in a desired finish bend shape, to heat the die and the whole constrained resin tube, or to employ a large size oven for heating them.

The method of the first preferred embodiment attains desired bending only by employing a simple partial bending die and an ultrasonic apparatus. Therefore, the cost of equipment is low.

Further, in this method, bending operations can be executed in a very short time. In the conventional methods it takes 15 to 20 minutes or more only to heat the tube in the oven, but in the method of the first preferred embodiment it is possible to finish partial bending in about several to dozens of seconds.

Furthermore, according to the first preferred embodiment, mechanization and automation of bending the whole resin tube 10 are possible by controlling the feed, stoppage and rotation of the resin tube, and the timing of bending the tube by the partial bending apparatus 12.

Second Preferred Embodiment

Next, a method of producing a bent resin tube by high frequency induction heating of a preferred embodiment according to the present invention will be described with reference to FIGS. 4 to 6.

Figure 4:
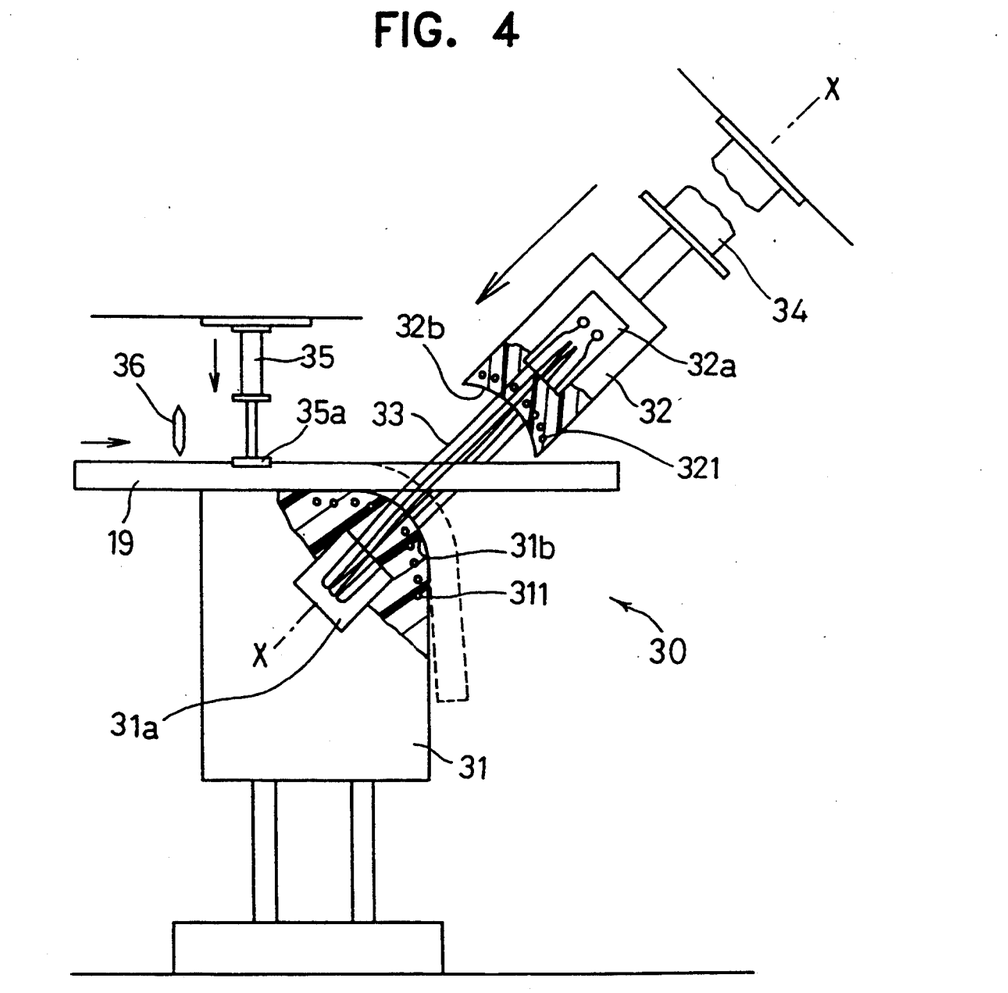
FIG. 4 is a view, partially in cross section, of a bending apparatus used in a method of a second preferred embodiment according to the present invention.

Referring now to FIG. 4, one end of an elongated straight resin tube 19 formed of nylon is fed between a pair of opposing bending dies 31, 32 of a partial bending apparatus 30 which are formed of insulators such as phenol resin.

The one end of the fed resin tube 19 is fixed in a predetermined position by a vertically moving cylinder 35 which is installed above the stationary bending die 31. While a certain portion of the resin tube 19 to be bent is heated by high frequency induction heating, the certain portion is bent into a desired bend shape by the pair of bending dies 31, 32, thereby producing a bent resin tube.

More concretely, the partial bending apparatus 30 comprises the stationary bending die 31, and the movable bending die 32 which opposes to the stationary bending die 31 and permits die opening and closing. The movable bending die 32 is driven by a vertically moving cylinder 34.

The pair of bending dies 31, 32 have cavity portions 31a, 32a respectively, and a coil 33 winds between the cavity portions 31, 32. Application of an electric current to the coil 33 forms an alternating current magnetic field between the stationary bending die 31 and the movable bending die 32.

Figure 5:
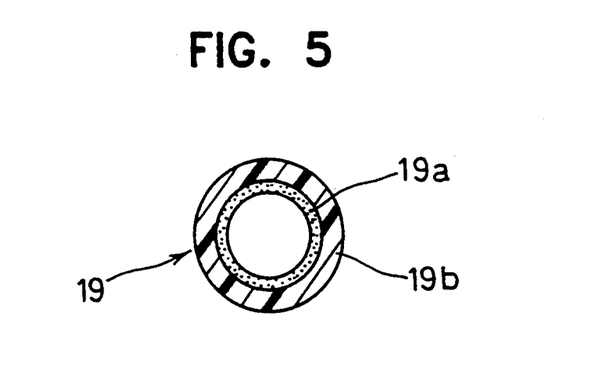
FIG. 5 is a cross sectional view of a resin tube shown in FIG. 4.

As shown in FIG. 5, the resin tube 19 is produced in a great length by extrusion molding a conductive layer 19a which comprises resin such as nylon and fluorine containing conductive powder such as carbon and iron powder, and then extruding an outer layer 19b which comprises nylon, polyester or the like on the outer circumference of the conductive layer 19a.

Because the inner layer 19a serves as a conductor, the one end portion of the resin tube 19 held between the stationary bending die 31 and the movable bending die 32 is heated by induction heating as rapidly as possible and gradually softened. Of course, the resin tube 19 can be formed by the conductive layer 19a alone.

At the same time, the movable bending die 32 is intermittently and gradually moved to the stationary bending die 31 by the vertically moving cylinder 34 for die closing. Thus, the certain portion of the resin tube 19 is plastically bent in conformity with bending portions 31b, 32b of the bending dies 31, 32 as shown by the dotted line in FIG. 4.

The pair of bending dies 31, 32 are respectively provided with a multiplicity of holes for cooling 311, 321 adjacent to the respective bending portions 31b, 32b. Cooling water is supplied to the holes for cooling 311, 322 in a die closed condition, in order to cool and solidify the one end of the heated resin tube 19 rapidly. After that, the resin tube 19 is cut by a cutter 36 installed behind the stationary bending die 31. Thus, a desired bent resin tube is obtained.

Figure 6:
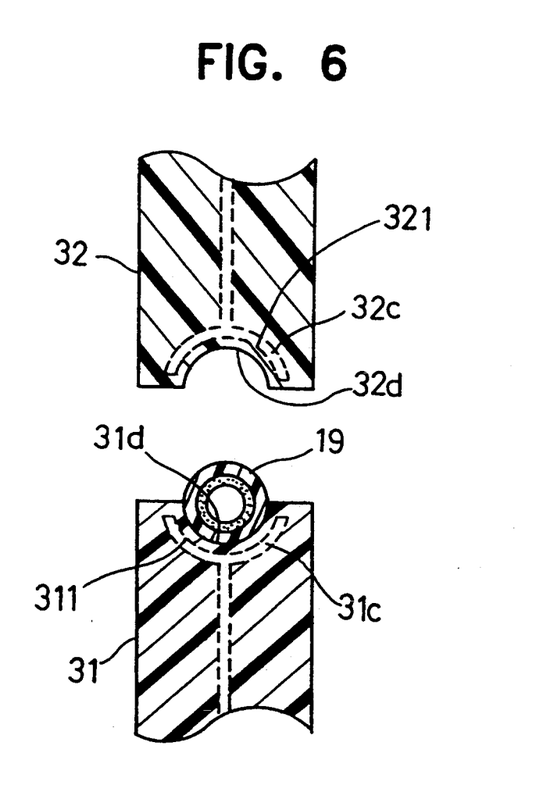
FIG. 6 is a cross sectional view of a main part of the bending apparatus, taken along line X—X of FIG. 4.

As shown in FIG. 6, it is preferable that groove 31d, 32d each of which has a cross section of a semicircle having the same radius as that of the resin tube are formed on the respective opposing surfaces of the stationary bending die 31 and the movable bending die 32, in order to bend the resin tube 19 beautifully.

The conductive layer may be formed between an inner layer comprising, for example, nylon and an outer layer comprising, for example, polyester.

The method of this preferred embodiment does not use a large die for constraining the whose tube shape or a large oven. Also, this method remarkably decreases the heating time and cooling time required for bending operations when compared to the conventionally bending methods, and thus improves production efficiency. Further, damage on the tube due to electrostatic sparks can be prevented by inhibiting electrostatic charge by making a conductive layer 19a an inner layer.

This partial bending apparatus 30 can also produce a three-dimensionally bent resin tube by bending one end of the elongated straight resin tube 19 as described in the above, and then, twisting or turning the tube 19 around the axis while feeding further the elongated resin tube 19, and after that, fixing the tube 19 at a predetermined position, and heating and bending another certain portion of the tube 19 to be bent partially in the same method as described in the above.

Figure 7:
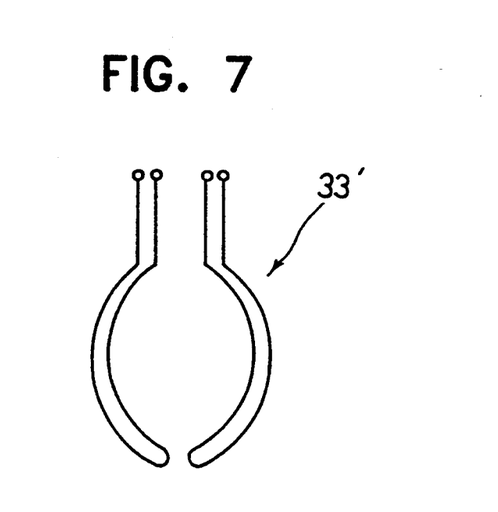
FIG. 7 is a diagrammic view of a split coil used in another method according to the second preferred embodiment of the present invention.

The heating portion may be increased by modifying the pair of bending dies 31, 32 of the partial bending apparatus 30 by employing a split coil 33' as shown in FIG. 7.

Figure 8:
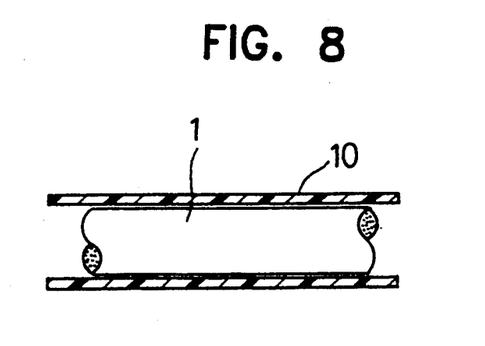
FIG. 8 is a cross sectional view of a resin tube having a conductive mandrel therein used in another method according to the second preferred embodiment of the present invention.

Further, as shown in FIG. 8, a conductive elastic mandrel 1 made or rubber, polyester or the like in which metallic power is mixed may be inserted into the resin tube 10 and heated as a high-frequency induction heating element in the same method as described in the above, thereby allowing the mandrel 1 to heat the resin tube 10. Then, a certain portion of the resin tube 10 is bent by the partial bending apparatus 30, and the mandrel 1 is removed from the tube 10. Thus a bent resin tube is obtained.

Third Preferred Embodiment

Figure 9:
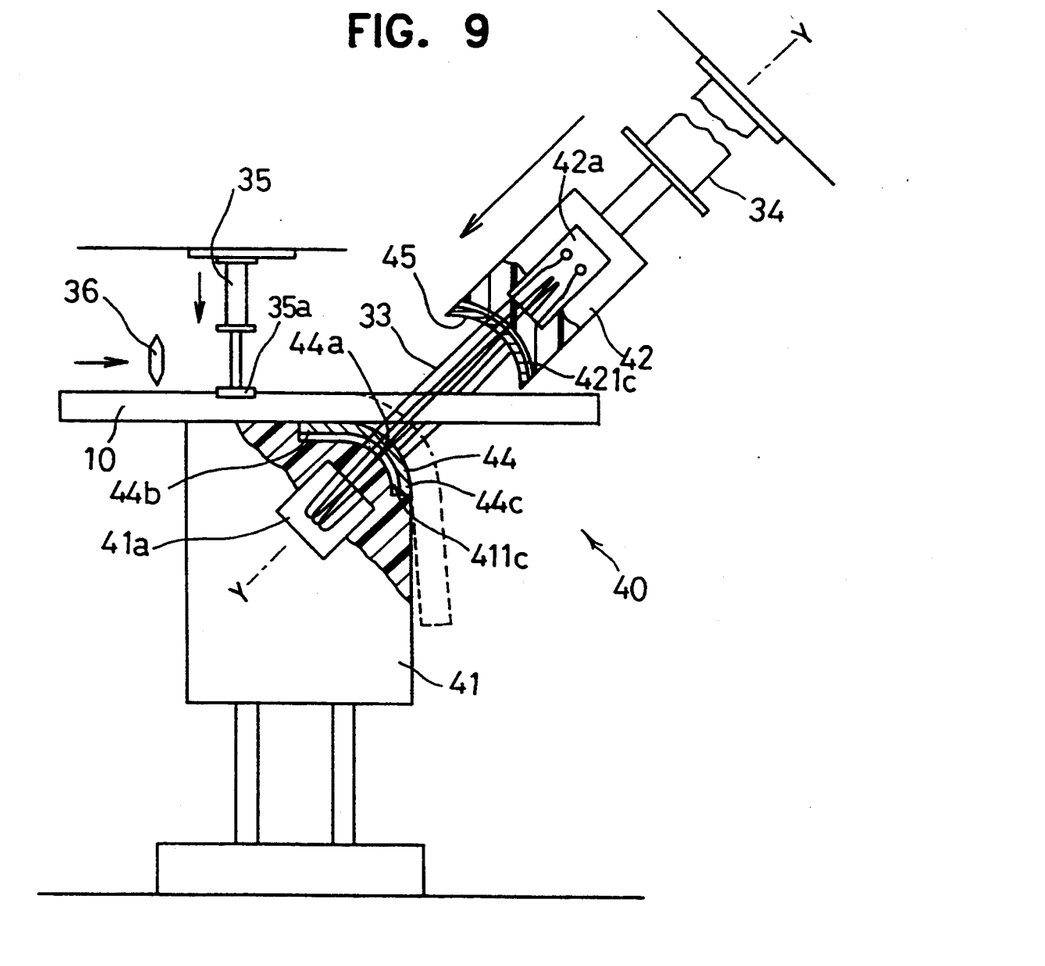
FIG. 9 is a view, partially in cross-section, of a bending apparatus used in a method of a third preferred embodiment according to the present invention.

Another production method using high frequency induction heating with be described with reference to FIG. 9.

The same reference numbers designate the same or similar parts used in those in FIG. 4. One end of an elongated straight resin tube 10 is fed between a stationary bending die 41 and a movable bending die 42 of a partial bending apparatus 40 in the same way as in the second preferred embodiment. Then, the end of the tube 10 is fixed in a predetermined position by a presser plate 35a of a vertically moving cylinder 35.

The pair of the bending dies 41, 42 formed of insulators are respectively provided with cavity portions 41a, 42a. When an electric current is applied to a coil 33 winds between the cavity portions 41a, 42a, conductors 44, 45 made of steel plates and adhered to the respective opposing surfaces of the stationary bending die 41 and the movable bending die 42 are heated directly in an alternating current magnetic field in a short time.

The conductor 44 fixed on the stationary bending die 41 has a bending portion 44a for bending the resin tube 10 into a desired bend shape. A rear end 44b of the bending portion 44a extends longer than a force end 44c of the bending portion 44a.

The lower side of the resin tube 10 which has been fixed in a predetermined position is gradually heated and softened from the rear end of the conductor 44. By moving the movable bending die 42 for die closing in the direction shown by the arrow in FIG. 4, the upper side of the resin tube 10 is heated by the movable bending die 42, and at the same time the one end of the resin tube 10 is bent gradually and beautifully along the conductors 44, 45 as shown by the dotted line in FIG. 9.

The certain portion of the resin tube 10 is elastically deformed into a desired bend shape partially by holding the bending dies 41, 42 in a die closed condition.

Figure 10:
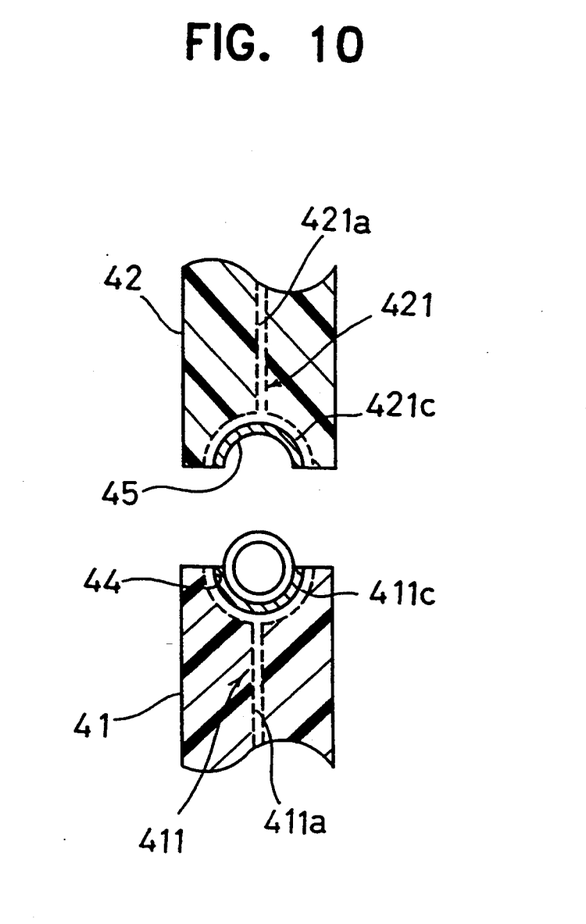
FIG. 10 is an enlarged cross sectional view of a main part of the bending apparatus, taken along line Y—Y of FIG. 9.
Figure 11:
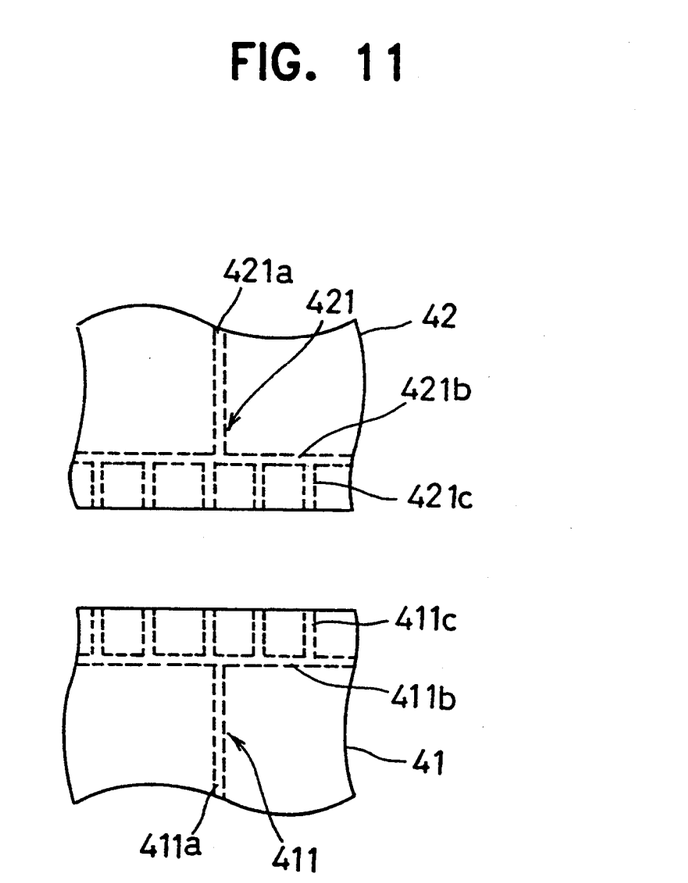
FIG. 11 is a side view of the main part shown in FIG. 10.

As shown in FIGS. 10 and 11, the stationary bending die 41 and the movable bending die 42 are respectively provided with holes for cooling 411, 412 in order to cool the conductors 44, 45 rapidly.

The holes for cooling 411, 421 respectively comprise inlet holes 411a, 412a, axial holes 411b, 421b extended axially from the inlet holes 411a, 412a, and a plurality of circumferential holes 411c, 412c extended circumferentially from the axially extended holes 411b, 412b. The axial holes 411b, 421b and the circumferential holes 411c, 412c are adjacent to the conductors 44, 45.

In a die closed condition where the certain portion of the resin tube 10 has been elastically deformed into a desired bend shape, cooling air or cooling water is supplied to the holes for cooling 411, 421, thereby cooling the conductors 44, 45 rapidly. Accordingly, the bent portion of the resin tube 10 is rapidly cooled and solidified in the desired bend shape.

After that, the elongated bent resin tube 10 is cut by a cutter 36 provided behind the stationary bending die 41, thereby producing a desired bent resin tube.

The method of this preferred embodiment attains advantages similar to those obtained in the second preferred embodiment. In particular, this preferred embodiment has an advantage of solidifying the tube 10 effectively by cooling the conductors 44, 45 rapidly.

Fourth Preferred Embodiment

Figure 12:
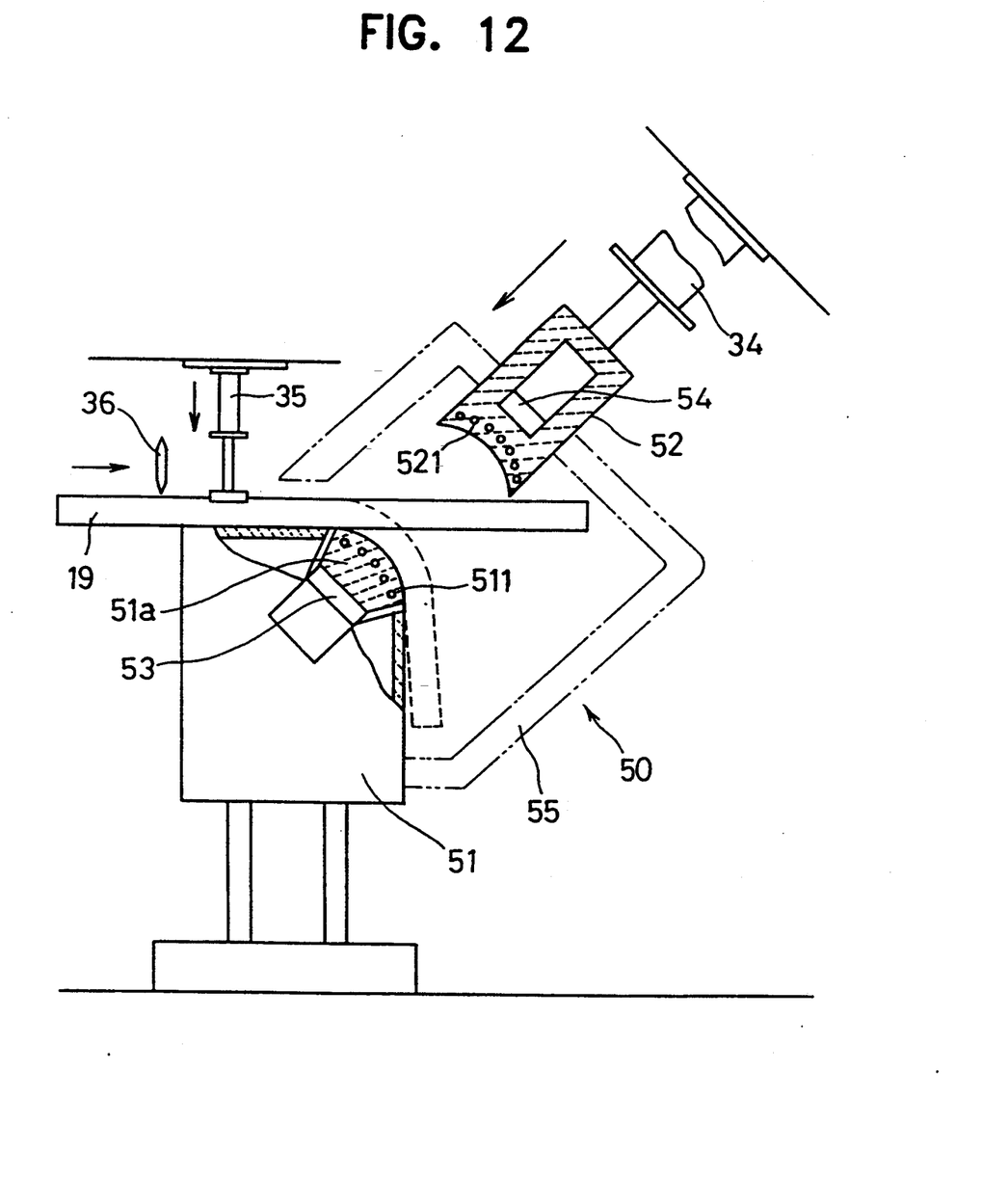
FIG. 12 is a view, partially in cross section, of a bending apparatus used in a method of a fourth preferred embodiment according to the present invention.

Next, still another production method using high frequency dielectric heating will be described with referene to FIG. 12. The same reference numbers designate the same or similar parts used in FIG. 4. In FIG. 12, 50 designates a partial bending apparatus having a pair of bending dies 51, 52 opposing to each other.

The stationary bending die 51 on the lower side has a ceramics bending die part 51a having a bending portion on the surface opposing to the bending die 52, and one plate electrode 53 provided below the bending die part 51a.

The movable bending die 52 is provided detachably from the stationary bending die 51 so as to permit die opening and closing. The other plate electrode 54 is provided in the center of the movable bending die 52 so as to be in parallel with the plate electrode 53.

Employed herein the same elongated straight resin tube 19 used in the second preferred embodiment, which comprises an inner layer 19a formed of a resin containing conductive powder such as carbon powder, and an outer layer 19b formed of resin such as nylon. Inthis preferred embodiment, the inner layer 19a serves as a dielectric substance. As shown in FIG. 12, when one end of the elongated straight resin tube 19 is fed between the stationary bending die 51 and the movable bending die 52, high frequency electric field is applied between the parallel plate electrodes 53, 54, thereby heating the inner layer 19a which serves as a dielectric substance as rapidly as possible.

Namely, a certain portion of the resin tube 19 to be bent is heated as rapidly as possible, and the movable bending die 52 is intermittently and gradually moved in the direction shown by the arrow in FIG. 12 so as to close the die 50. In this way, the resin tube 19 is elastically deformed in a desired bend shape shown by the dotted line in FIG. 12.

After that, the bent portion is cooled and solidified in a desired bend shape by supplying cooling water to holes for cooling 511, 521 provided on the bending die part 51a of the stationary bending die 51 and the movable bending die 52 in a die closed condition. Thus, a bent resin tube is produced in a considerably short time as in the second preferred embodiment.

A barrier 55 formed of aluminum covers the pair of bending dies 51, 52 in order to prevent electric wave leakage.

The method of producing a bent resin tube according to this preferred embodiment offers advantages similar to those obtained in the second preferred embodiment.

The preferred embodiments described herein are illustrative and not restrictive, and many modifications and variations are possible in the light of the above teachings. It is therefore to be understood that within the scope of the appended claims, the invention may be practiced otherwise than as specifically described. For instance, of course, the preferred embodiments of the preseent invention can be practiced in combinations thereof. In the first preferred embodiment, both of the male die and the female die can be constituted by horns, and ultrasonic vibrations can be applied to the certain portion of the resin tube to be bent from the both horns.

What is claimed is:

1. A method of producing a bent resin tube, comprising the steps of:
   placing a certain portion of a straight resin tube to be bent in a partial bending die;
   applying ultrasonic vibrations to said certain portion through a horn which constitutes said bending die so as to heat said certain portion partially; and
   bending said certain portion by said partial bending die, thereby rendering a desired bend shape to said resin tube.

2. A method of producing a bent resin tube, comprising the steps of:
   forming a straight resin tube comprising a single conductive layer in which conductive powder is mixed or plurality of layers including a conductive layer in which said conductive powder is mixed; and
   high frequency induction heating said conductive layer of a certain portion to be bent, thereby heating said straight resin tube partially, and at the same time, bending said heated certain portion partially by a partial bending die.

3. A method of producng a bent resin tube, comprising the steps of:
- forming a straight resin tube comprising a single layer or a plurality of layers including a conductive layer in which conductive powder is mixed;
- placing a certain portion of said straight resin tube to be bent between a pair of opposing partial bending dies; and
- high frequency induction heating said certain portion partially by forming an alternating current magnetic field between said pair of partial bending dies, and at the same time, bending said certain portion partially by said pair of partial bending dies.

4. A method of producing a bent resin tube, comprising the steps of:
- placing a certain portion of a straight resin tube to be bent between a pair of opposing partial bending dies; and
- high frequency induction heating conductors which constitute bending portions of said partial bending dies, thereby partially heating said certain portion to be bent, and at the same time, bending said certain portion partially by said partial bending dies.

5. A method of producing a bent resin tube, comprising the steps of:
- forming a straight resin tube comprising a single layer or a plurality of layers including a conductive or semiconductive layer in which conductive powder is mixed; and
- high frequency dielectric heating said conductive or semiconductive layer of a certain portion of said straight resin tube to be bent, thereby heating said straight resin tube partially, and at the same time, bending said heated certain portion partially by a partial bending die.

6. A method of producing a bent resin tube, comprising the steps of:
- holding an elastic mandrel in which conductive powder is mixed in a straight resin tube;
- placing a certain portion of said straight resin tube to be bent in which said elastic mandrel is held between a pair of opposing partial bending dies; and
- high frequency induction heating said certain portion partially by forming an alternating current magnetic field between the pair of partial bending dies, and at the same time, bending said certain portion partially by said pair of partial bending dies.

* * * * *